Feb. 12, 1935.   H. R. C. ANTHONY   1,991,132
DRY CELL
Filed June 11, 1932
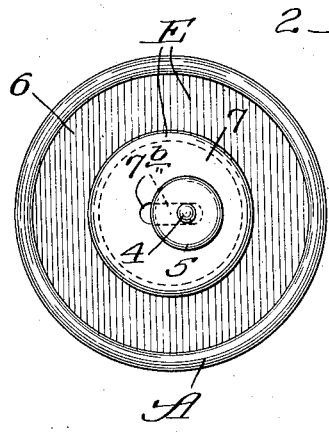
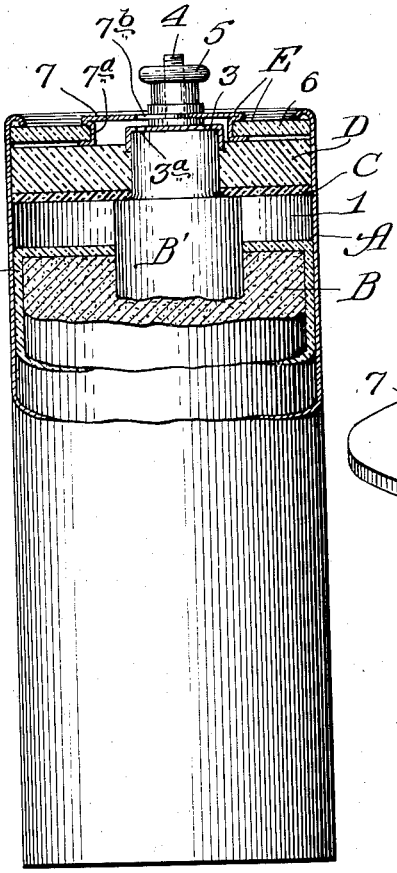
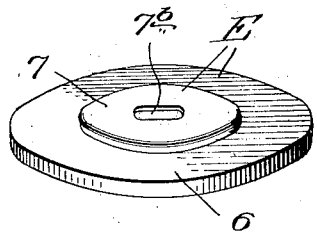
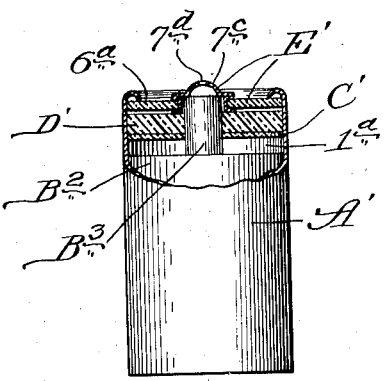
Inventor:
Herman R. C. Anthony,
By Dyrenforth, Lee, Chritton & Wiles,
Att'ys Patented Feb. 12, 1935

1,991,132

UNITED STATES PATENT OFFICE 1,991,132

DRY CELL

Herman R. C. Anthony, Madison, Wis., assignor to French Battery Company, Madison, Wis., a corporation of Wisconsin Application June 11, 1932, Serial No. 616,709

6 Claims. (Cl. 136—133)

This invention relates to dry-cells, and is applicable both to flashlight cells and standard cells equipped with terminals adapted for connection with electric conductors.

The primary object is to provide a hermetically sealed cell of improved construction, which is strong, durable and of pleasing appearance.

The invention is illustrated in preferred embodiments in the accompanying drawing, in which:

Fig. 1 is an elevational view, partly in section, of a standard dry-cell embodying the invention;

Fig. 2 is a plan view of the cell shown in Fig. 1;

Fig. 3 is a perspective view of a pre-formed outer closure employed; and

Fig. 4 is an elevational view, partly in section, of a flashlight cell embodying the invention.

In the construction illustrated in Figs. 1–3, A designates a container, preferably of zinc, which constitutes one electrode of the cell; B a body of depolarizing mixture within the container, within which is embedded a carbon pole B' which extends some distance beyond the upper end of the depolarizing body; C a washer embracing the upper portion of the carbon pole, and preferably separated from the body B by a space 1, said washer being preferably impregnated with paraffin; D a layer of sealing compound above the washer C and forming a hermetic seal between the carbon pole and the wall of the container; and E a pre-formed closure disposed above and serving to protect the sealing compound.

The container A may be constructed in any suitable manner. Preferably it consists of a zinc cup drawn from a disk of said zinc.

The depolarizing body B may consist of any suitable material for the purpose known to the art. This body is shown enveloped within a bibulous lining 2, which may be of paper or cloth, and which may be impregnated with a suitable electrolyte.

The disk C usually is formed from cardboard, and preferably is impregnated, as stated.

The sealing compound may be poured, in molten condition, into the cell and allowed to harden therein. This compound may be any suitable compound adapted to produce a hermetic seal, and preferably is somewhat tacky, so that it will form and maintain air-tight joints with the inner wall of the container and with the upper portion of the carbon electrode. The carbon is shown provided with a shoulder on which the washer C is supported, but this is not essential.

The reduced upper end of the carbon is shown fitted with a metal cap 3, which is equipped with a threaded stud, or terminal-stem 4. The sealing compound is shown covering a portion of the flange of the cap 3, but this is not essential. The threaded stud 4 is equipped with a nut 5.

The pre-formed outer closure E is shown as comprising a straight annulus 6 of insulating material, and a metal terminal-disk 7, which forms a center for said outer closure. Preferably, the disk 6 is constructed of strong, fibrous material, such as hard fiber, or strong pasteboard; and preferably the central terminal disk 7 is provided with a peripheral channel, indicated at 7$^a$, which receives the inner peripheral portion of the annular disk 6. The channel 7$^a$ may be provided by bending the peripheral portion of the metal disk downwardly and then striking inwardly the bent portion to form the peripheral channel. The walls of the channel may be clinched upon the inner peripheral portion of the member 6. The outer peripheral portion of the disk 6 fits snugly within the upper portion of the container A; and the outer closure is secured in position over the sealing compound D in any suitable manner, but preferably by spinning or curling the upper edge of the container inwardly to form a bead with the edge portion pressing firmly against the upper surface of the member 6.

The terminal disk 7 is provided with a perforation 7$^b$, which preferably is in the form of a slot adapted to permit the terminal-stem 4 to extend therethrough, regardless of whether or not said terminal-stem is off-center. In the manufacture of cells of this character, the carbon poles are not always truly centered. In the present construction, the terminal-disk 7 is centrally located by preference, and the appearance of the cell will not be marred by reason of eccentric location of the terminal-stem, within reasonable limits. Hence, the improvement renders it wholly unnecessary to discard cells which do not have the carbon pole accurately centered. In Figs. 1 and 2, the eccentricity commonly incidental to manufacture is shown exaggeratedly, for purposes of illustration.

In the flashlight cell embodiment shown in Fig. 4, A' designates the container; B$^2$ the core or depolarizing body equipped with a carbon pole B$^3$; C' the pasteboard disk separated by a space 1$^a$ from the upper end of said core; D' a layer of sealing wax or the like forming a hermetic seal; and E' a pre-formed outer closure.

In this instance, the outer closure is shown as comprising a straight pasteboard disk 6$^a$, and a terminal-disk 7$^c$. Here, the terminal disk 7$^c$ is in the form of a cap, which embraces the upper end portion of the carbon pole; and the straight portion of this cap is formed to provide a peripheral channel which receives the inner peripheral portion of the disk 6ª. The upper portion of the member 7ᶜ is in the form of a hollow boss adapted to serve as a contact-member. The dome-portion of the member 7ᶜ is shown provided with a vent 7ᵈ.

Reverting to the construction shown in Fig. 1, the carbon cap 3 is shown provided with a vent 3ª; also, the capped end of the carbon is largely housed within the terminal-disk 7, whose lower side presents a cavity, as shown in each construction described. The air space above the depolarizing body serves to receive any excess gases which may be generated within the cell and permit the gases to escape eventually through the carbon pole and through the vents associated with the central terminal of the cell. The provision of specially formed vents is not always an essential. For example, in Fig. 1, it is obvious that if the sealing compound D did not envelop the lower edge portion of the flange of the cap 3, the gases could escape from the carbon pole into the space within the outer terminal in cap 7, and thence through the slot 7ᵇ to the atmosphere.

It may be said further, with reference to the pre-formed outer closure employed, that it is a disk-like structure formed from hard, fabricated material, adapted to withstand shock and to serve as a protection to the upper end of the carbon pole and the sealing compound employed in the cell. It is necessary, of course, that the carbon pole be insulated from the upper portion of the container; and preferably this is accomplished by employing the annular disk 6 of insulating material in conjunction with a metal center cap, such as 7, which is associated with the central terminal of the cell.

The improved cell is adapted to prevent escape of electrolyte from the cell and consequent corrosion of the central terminal. The inner hermetic cell is protected by the outer pre-formed closure, which, in turn, is held firmly against the upper end of the carbon pole. The cell is of sightly appearance, strong and durable, and there is little danger of the parts becoming loose or broken, even under severe usage of the cell.

The foregoing detailed description has been given for clearness of understanding only, and no unnecessary limitations should be understood therefrom, but the appended claims should be construed as broadly as permissible, in view of the prior art.

What I regard as new and desire to secure by Letters Patent is:

1. A dry-cell comprising: a container forming one electrode of the cell; a depolarizing body therein equipped with an upwardly projecting carbon pole; a cap on said pole equipped with a terminal; a layer of sealing compound spaced above said body and hermetically sealing the space between said carbon pole and container; and a pre-formed closure comprising an annulus of hard, fibrous material secured in the upper portion of said container, and a metal terminal-disk having its peripheral portion permanently secured to said annulus and having a perforation through which said terminal extends.

2. A dry-cell as specified in claim 1, in which the perforation in said terminal-disk is elongated to permit said terminal to protrude therethrough when the terminal is off-center.

3. A dry-cell comprising: a metal container having an inwardly-spun upper margin; a depolarizing body in said container having an upwardly extending central electrode; a layer of sealing compound spaced above said body and interposed between said central electrode and said container and forming a hermetic seal; and a pre-formed outer closure comprising a central metal terminal-disk having an outwardly extending annular flange and an encircling annular fibrous disk carried by said flange, said terminal-disk being cupped to accommodate the upper portion of said electrode and the outer marginal portion of said fibrous disk being engaged by the in-turned portion of said container.

4. A dry-cell as specified in claim 3, in which said electrode is fitted with a cap equipped with a threaded terminal-stem, which extends through an elongated opening provided in said central metal terminal-disk.

5. A dry-cell comprising: a container forming one electrode of the cell; a depolarizing body therein equipped with an upwardly projecting carbon pole; a layer of sealing compound forming a hermetic seal with the upper portion of said carbon pole and the inner surface of said container; and a pre-formed outer closure disposed above said sealing compound and secured within the upper portion of said container, said outer closure comprising an annulus of insulating material having its outer peripheral portion engaging the inner wall of said container, and a metallic center disk having a pair of laterally extending annular flanges clinched to the inner marginal portion of said annulus and adapted to engage said carbon pole.

6. A dry-cell comprising: a metal container having an inwardly-spun upper margin; a depolarizing body in said container having an upwardly extending central electrode; a cap having a threaded terminal stem mounted on said electrode; a layer of sealing compound spaced above said body and interposed between said central electrode and said container and forming a hermetic seal therewith; and a pre-formed outer closure comprising a central terminal-disk having an elongated perforation impaled by said terminal stem, and an encircling annular fibrous disk carried thereby, said terminal-disk being cupped to accommodate the upper portion of said electrode and the outer portion of said fibrous disk being engaged by the in-turned portion of said container.

HERMAN R. C. ANTHONY.